United States Patent [19]

Short, III et al.

[11] Patent Number: 5,167,337
[45] Date of Patent: Dec. 1, 1992

[54] SCORED REVERSE BUCKLING RUPTURE DISK ASSEMBLY

[75] Inventors: Edward H. Short, III; Jim E. Ellis; Arnold L. Mundt, all of Tulsa; John L. Tyler, Collinsville, all of Okla.

[73] Assignee: BS&B Safety Systems, Inc., Tulsa, Okla.

[21] Appl. No.: 793,257

[22] Filed: Nov. 13, 1991

Related U.S. Application Data

[63] Continuation of Ser. No. 603,254, Oct. 25, 1990, abandoned, which is a continuation of Ser. No. 462,470, Jan. 9, 1990, abandoned.

[51] Int. Cl.⁵ .............................................. B65D 25/00
[52] U.S. Cl. .................................. 220/89.2; 137/68.1
[58] Field of Search ........................ 220/89.1-89.3, 220/207; 137/68.1, 70

[56] References Cited

U.S. PATENT DOCUMENTS

| 2,095,828 | 4/1936 | Nerad | 220/89 A |
|---|---|---|---|
| 2,336,490 | 12/1943 | Vico | 220/89 A |
| 3,294,277 | 12/1966 | Wood | 220/89 A |
| 3,484,817 | 12/1969 | Wood | 220/89 |
| 3,921,556 | 11/1975 | Wood et al. | 113/120 R |
| 4,073,402 | 2/1978 | Wood | 220/89.2 |
| 4,158,422 | 6/1979 | Witten et al. | 220/89.3 |
| 4,236,648 | 12/1980 | Wood et al. | 220/89 A |
| 4,404,982 | 9/1983 | Ou | 220/89.2 |
| 4,759,460 | 7/1988 | Mozley | 220/89 A |
| 4,795,051 | 1/1989 | Ou | 220/89.2 |
| 4,819,823 | 4/1989 | Kadakia et al. | 220/89.2 |
| 5,005,722 | 4/1991 | Short, III et al. | 220/89.2 |
| 5,082,133 | 1/1992 | Farwell et al. | 220/89.2 |

FOREIGN PATENT DOCUMENTS 2336889 4/1974 Fed. Rep. of Germany ..... 220/89.2

Primary Examiner—Allan N. Shoap
Assistant Examiner—S. Castellano
Attorney, Agent, or Firm—Laney, Dougherty, Hessin & Beavers

[57] ABSTRACT

An improved scored reverse buckling rupture disk assembly is provided. The assembly includes a reverse buckling rupture disk having one or more scores on a surface thereof forming lines of weakness which define a blow-out portion connected by a hinge area in the rupture disk. An annular rupture disk support member is positioned adjacent the concave side of the rupture disk, and a supporting member for preventing the blow-out portion from fragmenting or tearing away from the rupture disk at the hinge thereof is disposed within the concave recess in the rupture disk.

9 Claims, 3 Drawing Sheets

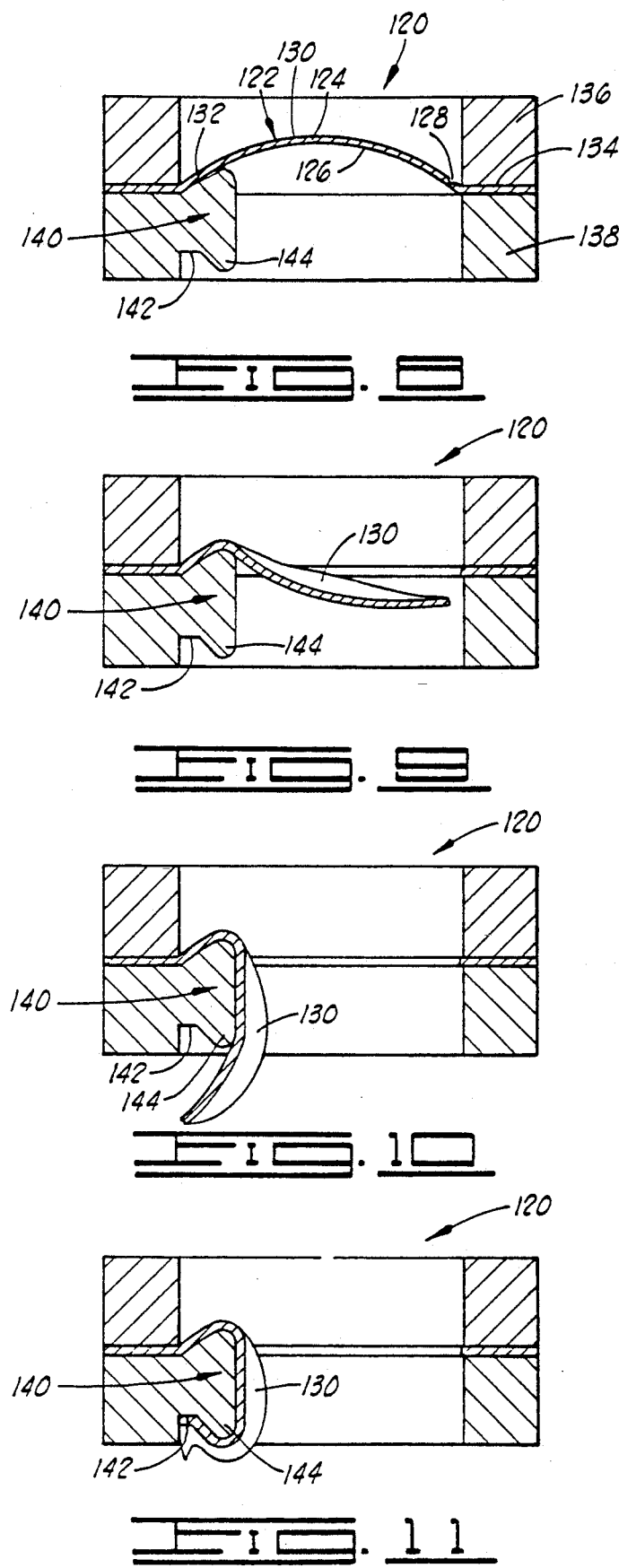

SCORED REVERSE BUCKLING RUPTURE DISK ASSEMBLY

This is a continuation of copending application Ser. No. 07/603,254, filed on Oct. 25, 1990 which is a continuation of Ser. No. 07/462,470 filed on Jan. 9, 1990, both abandoned.

BACKGROUND OF THE INVENTION

1. Field of the Invention

The present invention relates generally to scored reverse buckling rupture disk assemblies, and more particularly, to an improved scored reverse buckling rupture disk assembly which includes a supporting member for preventing a blow-out portion of the rupture disk from tearing away therefrom.

2. Description of the Prior Art

Many pressure relief devices of the rupture disk type have been developed and used heretofore. Generally, such devices include a rupture disk supported between a pair of support members or flanges which are in turn connected to a relief connection in a vessel or system containing fluid pressure. When the fluid pressure within the vessel or system exceeds the design rupture pressure of the disk, rupture occurs causing pressurized fluid to be relieved from the vessel or system.

Rupture disks of the reverse buckling type have heretofore been developed and used successfully. Reverse buckling rupture disks include a domed portion and the fluid pressure from the vessel or system being protected is exerted on the convex side of the disk. Upon failure, the domed portion of the disk reverses and then ruptures. Originally, all reverse buckling rupture disk assemblies included knife blades positioned adjacent the rupture disks thereof on the outlet sides of the disks. Upon reversal, the disks impaled on the knife blades causing them to open in a predetermined manner. More recently, reverse buckling rupture disks have included scores on a surface thereof which create lines of weakness therein so that upon reversal, the disk tears along the lines of weakness. U.S. Pat. No. 3,484,817 issued Dec. 16, 1969 describes the construction and operation of scored reverse buckling rupture disks. A method of manufacturing scored reverse buckling rupture disks is described in U.S. Pat. No. 3,921,556 issued Nov. 25, 1975.

While scored reverse buckling rupture disks have been used successfully and have obviated the need for knife blades in a number of applications, fragmentation of scored reverse buckling rupture disks has heretofore been a problem in applications involving high pressures. That is, upon the reversal and rupture of a scored reverse buckling rupture disk along the lines of weakness formed by the scores in high pressure applications, fragmentation often occurs due to the high speed at which the disk reverses and the explosive nature of the ensuing rupture. Also, if some of the heretofore used reverse buckling rupture disks are damaged in installation or handling, they can reverse and not open until fluid pressure higher than the design rupture pressure is exerted thereon causing an unsafe condition to exist.

In order to lessen the chances of fragmentation upon the rupture of scored reverse buckling rupture disks in high pressure applications, C-scored reverse buckling rupture disk assemblies including means for catching and supporting the hinge areas of the disks have been developed and used heretofore. For example, U.S. Pat. No. 4,759,460 issued Jul. 26, 1988 describes a C-scored reverse buckling rupture disk assembly which includes an arcuate inwardly extending projection on the downstream side of the rupture disk. The projection is positioned whereby upon rupture, the blow-out portion defined by the C-score wraps about the projection and the hinge connecting the blow-out portion to the rupture disk is supported. In order to insure that the reversal of the rupture disk starts adjacent the projection, a dent is included in the rupture disk or a portion of the rupture disk support member adjacent the hinge includes a relieved area therein.

While the use of the projection of U.S. Pat. No. 4,759,460 and other similar supporting means in scored reverse buckling rupture disk assemblies have reduced the incidents of fragmentation in high pressure applications, fragmentation has still occurred as a result of the blow-out portions of such rupture disks tearing at the hinge areas whereby they are disconnected from the rupture disks.

By the present invention an improved scored reverse buckling rupture disk assembly is provided wherein fragmentation of the rupture disk upon the reversal and rupture thereof is substantially eliminated, and even if the rupture disk is damaged it will still rupture below its design rupture pressure.

SUMMARY OF THE INVENTION

An improved scored reverse buckling rupture disk assembly is provided which includes a reverse buckling rupture disk having a convex protrusion on one side and a corresponding concave recess in the other side defining a dome therein. The rupture disk has one or more scores on a surface thereof forming lines of weakness therein which define a blow-out portion connected by a hinge area in the rupture disk. At least one annular rupture disk support member is included in the assembly positioned adjacent the side of the rupture disk having the concave recess therein. A blow-out portion supporting member for preventing the blow-out portion upon rupture from fragmenting or tearing away from the rupture disk at the hinge area thereof is disposed within the concave recess in the rupture disk adjacent the hinge area. Upon reversal and rupture of the rupture disk, the blow-out portion is moved into contact with and is supported at the hinge area thereof by the supporting member.

It is, therefore, a general object of the present invention to provide an improved scored reverse buckling rupture disk assembly.

A further object of the present invention is the provision of an improved scored reverse buckling rupture disk assembly which can be utilized in high pressure applications without fragmentation upon rupture occurring.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 8 is a side cross-sectional view of an assembly of the present invention including yet another alternate form of blow-out portion supporting member.

FIG. 9 is a side cross-sectional view of the assembly of FIG. 8 but showing the rupture disk thereof after reversal and initial rupture has taken place.

FIG. 10 is a side cross-sectional view of the assembly of FIG. 8 after the blow-out portion of the rupture disk has partially wrapped around the supporting member.

FIG. 11 is a side cross-sectional view of the assembly of FIG. 8 after the blow-out portion of the rupture disk has completely wrapped around the supporting member.

DESCRIPTION OF PREFERRED EMBODIMENTS

Figure 1:
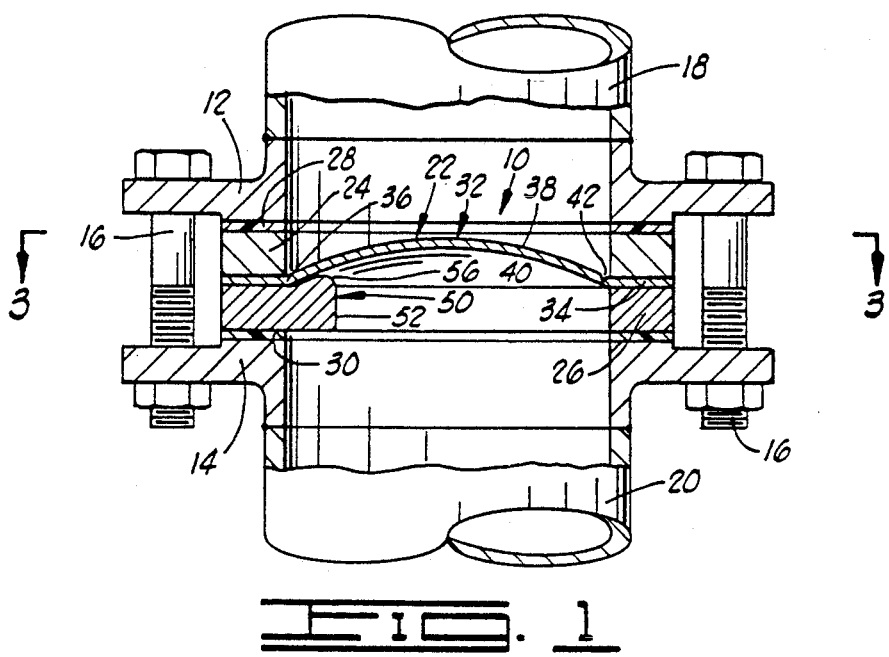
FIG. 1 is a side cross-sectional view of a scored reverse buckling rupture disk assembly of the present invention clamped between conventional pipe flanges.
Figure 2:
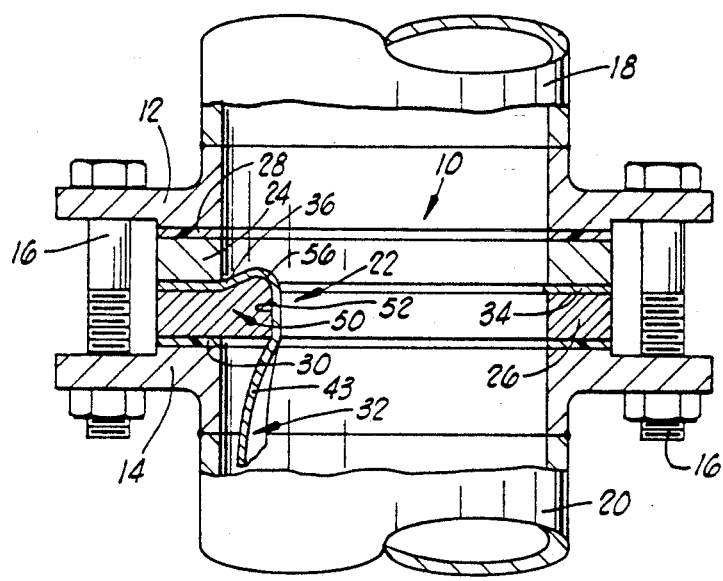
FIG. 2 is a side cross-sectional view of the assembly of FIG. 1 illustrating the rupture disk thereof after reversal and rupture.
Figure 3:
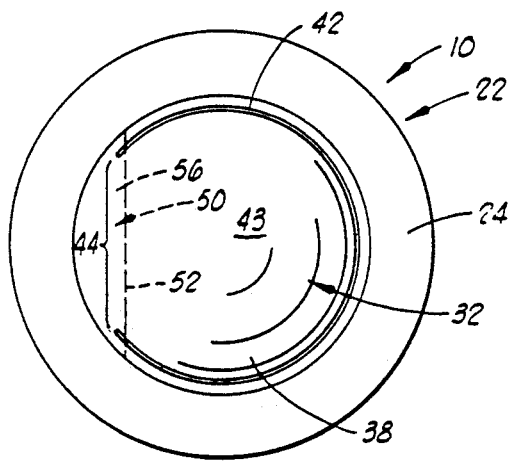
FIG. 3 is a view taken along line 3—3 of FIG. 1.

Referring now to the drawings, and particularly to FIGS. 1-3, a scored reverse buckling rupture disk assembly of the present invention is illustrated and generally designated by the numeral 10. The assembly 10 is shown clamped between a pair of conventional pipe flanges 12 and 14 by a plurality of bolts 16. The flange 12 is sealingly connected to a conduit 18 which is in turn connected to a vessel or system containing fluid pressure to be protected (not shown). The flange 14 is sealingly connected to a conduit 20 which leads pressurized fluid vented through the rupture disk assembly 10 to a point of disposal, storage or the like. The assembly 10 includes a scored reverse buckling rupture disk 22 clamped between a pair of annular rupture disk support members 24 and 26. A pair of gaskets 28 and 30 are positioned between the pipe flanges 12 and 14 and the annular support members 24 and 26.

As best shown in FIGS. 1 and 3, the scored reverse buckling rupture disk 22 is substantially circular and includes a domed portion 32 connected to an annular flat flange portion 34 by a transition connection 36. The domed portion 32 is formed in the rupture disk 22 by a convex protrusion 38 on the side of the rupture disk 22 facing the inlet annular support member 24 and a corresponding concave recess 40 in the other side of the rupture disk 22 facing the outlet annular support member 26. As will be understood, the annular flat flange portion 34 of the rupture disk 22 is clamped between annular seating surfaces provided on the annular support members 24 and 26. Further, as is well understood by those skilled in the art, in order to provide support to the transition connection 36 of the rupture disk 22, the outlet annular support member 26 can have a smaller internal diameter than the inlet support member 24 (not shown).

A single score 42 is formed in the side of the domed portion 32 of the rupture disk 22 which has the convex protrusion 38 thereon. The score 42 forms a line of weakness in the rupture disk 22 which defines a substantially circular blow-out portion 43 therein (FIG. 3) connected to the remaining portion of the rupture disk 22 by a hinge area 44 between the ends of the score 42. The term "score(s)" is used herein to mean one or more grooves, indentations or the like which form one or more lines of weakness in a rupture disk whereby upon failure of the rupture disk, it tears along such lines of weakness.

As is well understood by those skilled in the art, a single score 42 can be utilized as illustrated in FIG. 3, or a plurality of scores (similar to a dashed line) can be used to form a line of weakness defining the blow-out portion 43. As is also well understood, the score or scores can be located on either side of the rupture disk 22, in the domed portion 32 of the rupture disk 22 or in the annular flat flange portion 34 thereof. Also, the line of weakness formed by the score or scores can define a blow-out portion of a different shape than the substantially circular shape shown in FIG. 3, e.g., square, triangular, etc. Further, the hinge area can be unscored or the hinge area can contain a shallow score or scores (not shown) to improve the accuracy of the disk, i.e., to narrow the fluid pressure range which causes reversal and rupture.

Referring still to FIGS. 1-3, the outlet annular rupture disk support member 26 includes a supporting member 50 for supporting the area of the rupture disk 22 containing the hinge 44 upon the reversal and rupture of the rupture disk 22. In the form illustrated in FIGS. 1-3, the supporting member 50 is an integral part of the annular support member 26 and extends into the space defined by the concave recess 40 in the rupture disk 22, that is, the member 50 extends radially inwardly and upwardly into the concave recess 40 of the rupture disk 22. The support member 50 terminates radially inwardly in a vertical straight wall 52 which is on a line corresponding to a chord intersecting the interior walls of the annular support member 26 and terminates in the upward direction in a smooth rounded surface 56 close to, but not touching the rupture disk 22. The area of the rupture disk 22 containing the hinge area 44, i.e., the area between the ends of the score 42, is positioned directly adjacent the rounded surface 56 of the member 50. The distance between the rounded surface 56 and the side of the rupture disk 22 adjacent thereto is such that the rupture disk 22 does not contact the surface 56 until the domed portion 32 of the rupture disk 22 begins its reversal process. As shown in FIG. 3, the supporting member 50 extends radially inwardly past the hinge area 44 defined in the rupture disk 22 so that upon contact of the rupture disk 22 with the supporting member 50, the hinge 44 is supported on the rounded surface 56 of the supporting member 50.

Referring now specifically to FIG. 2, in operation of the rupture disk assembly 10, the fluid pressure from the vessel or system being protected is communicated to the assembly 10 by way of the conduit 18, the pipe flange 12 connected thereto and the inlet annular support member 24. When such pressure exceeds the design rupture pressure of the rupture disk 22, the domed portion 32 thereof reverses, i.e., inverts, and then tears along the lines of weakness formed by the score 42. As a result, the substantially circular blow-out portion 43 of the rupture disk 22 moves downwardly into and through the interior of the annular support member 26 and into the pipe flange 14 and conduit 20.

As the domed portion 32 reverses, the area thereof containing the hinge 44 contacts and is supported by the surface 56 of supporting member 50. The blow-out portion 43 of the rupture disk 22 tears away along the lines of weakness formed by the score 42, but remains attached to the remaining portion of the rupture disk 22 by the supported hinge 44 as illustrated in FIG. 2. Additionally, because of the contact between the rupture disk 22 and the supporting member 50, the reversal and rupture process of the disk 22 is slowed down whereby fragmentation of the blow-out portion 43 does not take place.

The required hinge support and slowing down of the reversal and rupture process to prevent fragmentation does not take place unless the surface 56 of the supporting member 50 extends into the concave recess 40 of the rupture disk 22 into close proximity with the surface of the rupture disk 22 in the area of the hinge 44. However, the surface 56 of the supporting member 50 cannot contact the rupture disk 22 or be so close thereto that it interferes with the start of the reversal process. For a 4" nominal size rupture disk, the surface 56 is spaced from the rupture disk a distance in the range of from about 0.010 inch to about 0.100 inch.

If the rupture disk 22 is damaged, and as a result, reverses without rupture, the surface 56 of the supporting member 50 contacts the disk and causes a concentrated stress in a portion of the score whereby rupture occurs at a fluid pressure below the design rupture pressure of the disk. When a C-scored rupture disk without the supporting member 50 reverses without rupture, a pressure greater than the design rupture pressure is generally required to cause rupture making the use of the disk potentially unsafe. The concentration of tearing forces in a portion of the score after reversal due to the contact with the supporting member 50 as described above also allows the assembly 10 to be effectively utilized in liquid service. Prior art C-scored reverse buckling rupture disk assemblies are generally limited to applications where the pressurized fluid is a gas.

Figure 4:
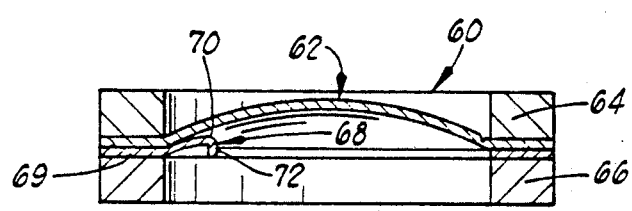
FIG. 4 is a side cross-sectional view of an assembly of the present invention including an alternate form of blow-out portion supporting member.

Referring now to FIG. 4, an alternate form of the apparatus of the present invention is illustrated and generally designated by the numeral 60. The apparatus 60 is identical to the apparatus 10 except for the form of the supporting member 68, and includes a scored reverse buckling rupture disk 62 clamped between inlet and outlet annular support members 64 and 66. Instead of the supporting member 68 being an intregral part of the annular support member 66, it is attached to an annular flat flange 69 which is clamped between the annular flat flange 69 of the rupture disk 62 and the outlet annular support member 66. Like the supporting member 50 of the assembly 10, the supporting member 68 is positioned within the concave recess of the rupture disk 62 directly adjacent the hinge area of the rupture disk 62. That is, the supporting member 68 extends radially inwardly and upwardly into the concave recess in the rupture disk 62 and terminates in a rounded surface 70. The surface 70 is positioned close to the surface of the rupture disk 62, but does not contact it. Like the assembly 10 as illustrated in FIG. 3, the supporting member 68 terminates inwardly in a side 72 corresponding to a chord of the circular interior opening of the annular support member 66. The operation of the assembly 60 is identical to the operation of the assembly 10 as described above.

Figure 5:
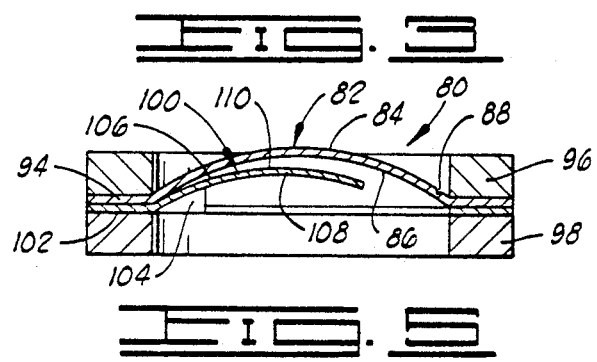
FIG. 5 is a side cross-sectional view of an assembly of the invention including yet another alternate form of blow-out portion supporting member.
Figure 6:
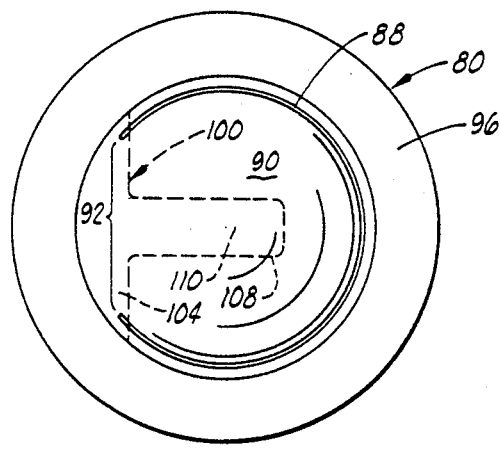
FIG. 6 is a top plan view of the assembly of FIG. 5.
Figure 7:
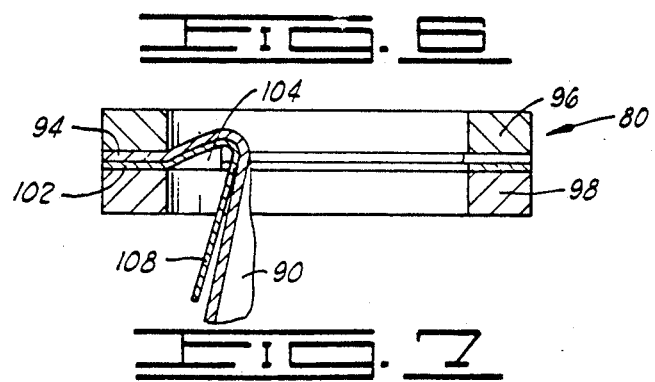
FIG. 7 is a side cross-sectional view of the assembly of FIG. 5 after reversal and rupture of the rupture disk thereof.

Referring now to FIGS. 5-7, a scored rupture disk assembly of the present invention including a different form of supporting member is illustrated and generally designated by the numeral 80. The assembly 80 is similar to the assemblies 10 and 60 described above in that it includes a domed reverse buckling rupture disk 82 having a convex protrustion 84 on one side and a corresponding concave recess 86 in the other side. The convex side of the rupture disk 82 includes a score 88 therein which forms a line of weakness defining a partially circular blow-out portion 90 connected by a hinge 92 (FIG. 6) in the rupture disk 82.

The domed portion 84 of the rupture disk 82 is connected to an annular flat flange portion 94 which is clamped between inlet and outlet annular rupture disk support members 96 and 98, respectively.

A blow-out portion supporting member 100 is disposed within the concave recess 86 of the rupture disk 82 for preventing the blow-out portion 90 of the rupture disk 82 from fragmenting and/or tearing away at the area of the hinge 92. In the embodiment shown, the supporting member 100 is attached to an annular flat flange 102 positioned between the annular flat flange 94 of the rupture disk 82 and the annular support member 98. The supporting member 100 extends radially inwardly and upwardly into the concave recess 86 of the rupture disk 82, and a non-collapsible first portion 104 terminates along a line corresponding to a chord of the circular opening in the annular support member 98. The non-collapsible portion 104 of the supporting member 100 is positioned immediately below the portion of the rupture disk 82 containing the non-weakened hinge 92. The surface 106 of the non-collapsible portion 104 adjacent the surface of the concave recess 86 in the rupture disk 82 corresponds in shape to the concave recess 86, but does not contact the surface thereof.

The supporting member 100 additionally includes a collapsible finger portion 108 which extends radially inwardly within the concave recess 86 of the rupture disk 82 and terminates adjacent a central portion of the rupture disk 82. The surface 110 of the finger portion 108 of the supporting member 100 adjacent the surface of the concave recess 86 of the rupture disk 82 generally correspond in shape to the surface of the concave recess 86 but does not contact such surface.

In operation of the assembly 80, and referring particularly to FIG. 7, when the fluid pressure exerted on the convex side of the rupture disk 82 exceeds the design rupture pressure of the disk, the disk reverses and tears along the lines of weakness created by the score 88. As the rupture disk 82 reverses, it comes in contact with the non-collapsible portion 104 and with the collapsible finger portion 108 of the supporting member 100. The non-collapsible portion 104 supports the hinge 92 defined in the rupture disk 82 whereby tearing at the hinge area is prevented. The collapsible finger portion 108 moves with the rupture disk 82 during reversal and collapses beneath the blow-out portion 90 after the blow-out portion 90 separates from the rupture disk 82. The finger portion 108 functions to absorb energy and slow down the blow-out portion 90 as it moves through the annular support member 98 thereby preventing fragmentation of the blow-out portion 90.

As will be understood, the supporting member 100 can be attached to or a part of the outlet annular support member 98 rather than being attached to the annular flange portion 94. Also, the finger portion 108 of the support member 100 can take a variety of shapes other than the substantially rectangular shape illustrated.

Referring now to FIGS. 8-11, a scored rupture disk assembly of the present invention including a different form of supporting member is illustrated and generally designated by the numeral 120. The assembly 120 is similar to the assemblies 10, 60 and 80 described above in that it includes a domed reverse buckling rupture disk 122 having a convex protrusion 124 on one side and a corresponding concave recess 126 in the other side. A score 128 is formed in the convex side of the rupture disk 122 which forms a line of weakness defining a partially circular blow-out portion 130 connected by a hinge 132 in the rupture disk 122.

The domed portion 124 of the rupture disk 122 is connected to an annular flat flange portion 134 which is clamped between inlet and outlet annular rupture disk support members 136 and 138, respectively.

A blow-out portion supporting member 140 is disposed within the concave recess 126 of the rupture disk 122 for preventing the blow-out portion 130 of the rupture disk 122 from fragmenting and/or tearing away at the area of the hinge 132. In the embodiment shown, the supporting member 140 is attached to the outlet support member 138 and extends radially inwardly and upwardly into the concave recess 126 of the rupture disk 122 in a manner identical to the support member 50 of the assembly 10 described above. In addition, the supporting member 140 includes a recess 142 in the bottom thereof forming a downwardly projecting lipped portion 144 extending along the inside bottom edge of the supporting member 140.

In operation of the assembly 120, and referring particularly to FIGS. 9-11, when the fluid pressure exerted on the convex side of the rupture disk 122 exceeds the design rupture pressure of the disk, the disk reverses and tears along the lines of weakness created by the score 128 (FIG. 9). As the rupture disk 122 reverses it comes into contact with the rounded upper surface of the supporting member 140 and forceably slaps into contact with the internal side of the support member 140 (FIG. 10) whereby the portion of the blow-out portion 130 extending below the lip 144 is caused to deform into the recess 142 as shown in FIG. 11. Thus, the presence of the recess 142 and lip 144 at the bottom of the supporting member 140 causes the blow-out portion 130 to be latched onto the supporting member 140. This insures that the blow-out portion 130 does not subsequently fatigue and break off due to the flow of relieved pressurized fluids flowing through the assembly 120 or other similar cause.

Thus, the present invention is well adapted to carry out the objects and attain the ends and advantages mentioned as well as those inherent therein. While numerous changes in the arrangement, shapes and construction of the parts of the present invention may be made by those skilled in the art, such changes are encompassed within the spirit of this invention as defined by the appended claims.

What is claimed is:

1. A scored reverse buckling rupture disk assembly comprising:
   a reverse buckling rupture disk having a convex protrusion on one side and a corresponding concave recess in the other side defining a dome therein and having at least one score on either side thereof forming a line of weakness therein which defines a blow-out portion connected by a hinge area in said rupture disk;
   an annular rupture disk support member positioned adjacent the side of said rupture disk having said concave recess therein; and
   a supporting member for preventing said blow-out portion from fragmenting or tearing away from said rupture disk, said supporting member having an extension extending radially inwardly past said hinge area of said rupture disk and extending into said concave recess close to but not touching said hinge area, said extension having two ends defining its radial extent, said extension being arcuate in shape from one of its ends to its other end, said hinge area is positioned directly adjacent said extension and whereby upon reversal and rupture of said rupture disk, said blow-out portion is moved into progressive contact with said extension of said supporting member to slow the rupture process and support said hinge area.

2. The assembly of claim 1 wherein said supporting member is attached to the interior of said annular rupture disk support member.

3. The assembly of claim 1 wherein said dome in said rupture disk is circular in peripheral shape and is connected to an annular flat flange portion of said rupture disk.

4. The assembly of claim 1 wherein said blow-out portion is substantially circular.

5. The assembly of claim 4 wherein said hinge area defined in said rupture disk corresponds to a chord of said blow-out portion.

6. A scored reverse buckling rupture disk assembly that functions to slow the reversal and rupture process, comprising:
   a reverse buckling rupture disk having a convex protrusion on one side and a corresponding concave recess in the other side defining a dome therein and having a score on either side thereof forming a line of weakness therein which defines a substantially circular blow-out portion connected by a hinge corresponding to a chord of said blow-out portion in said rupture disk;
   an annular rupture disk support member positioned adjacent the side of said rupture disk having said concave recess therein; and
   a supporting member for preventing said blow-out portion from fragmenting or tearing away from said rupture disk at said hinge, said supporting member having an extension extending radially inwardly past said hinge and extending into said concave recess close to but not touching said hinge, said extension having two ends defining its radial extent, said extension being arcuate in shape from one of its ends to its other end, said hinge is positioned directly adjacent said extension and whereby upon reversal and rupture of said rupture disk, said blow-out portion is moved into progressive contact with said extension of said supporting member and is supported at said hinge by said extension.

7. The assembly of claim 6 which is further characterized to include a second annular rupture disk support member positioned adjacent the side of said rupture disk having said convex protrusion thereon.

8. The assembly of claim 6 wherein said supporting member is attached to the interior of said annular rupture disk support member.

9. The assembly of claim 7 wherein said dome in said rupture disk is circular in peripheral shape and is connected to an annular flat flange portion of said rupture disk.

* * * * *